(12) United States Patent
Zhou

(10) Patent No.: US 8,746,950 B2
(45) Date of Patent: Jun. 10, 2014

(54) FRONT FRAME AND BACK LIGHT MODULE

(75) Inventor: Gege Zhou, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 300 days.

(21) Appl. No.: 13/375,352

(22) PCT Filed: Oct. 31, 2011

(86) PCT No.: PCT/CN2011/081584
§ 371 (c)(1),
(2), (4) Date: Nov. 30, 2011

(87) PCT Pub. No.: WO2013/060030
PCT Pub. Date: May 2, 2013

(65) Prior Publication Data
US 2013/0107429 A1    May 2, 2013

(30) Foreign Application Priority Data
Oct. 28, 2011    (CN) .......................... 2011 1 0333736

(51) Int. Cl.
*F21V 7/04*    (2006.01)
(52) U.S. Cl.
USPC ............................ 362/632; 362/97.1; 362/634
(58) Field of Classification Search
USPC .................... 362/532, 533, 534, 97.1, 97.3
See application file for complete search history.

(56) References Cited

U.S. PATENT DOCUMENTS

| 7,116,386 | B2 * | 10/2006 | Lee et al. | 349/58 |
| 2005/0035916 | A1 * | 2/2005 | Brown et al. | 343/754 |
| 2009/0244470 | A1 | 10/2009 | Yamate | |
| 2011/0227748 | A1 * | 9/2011 | Schaible et al. | 340/686.6 |

FOREIGN PATENT DOCUMENTS

| CN | 1360242 A | 7/2002 |
| CN | 1598658 A | 3/2005 |
| CN | 2725935 Y | 9/2005 |
| CN | 1901719 A | 1/2007 |
| CN | 101241257 A | 8/2008 |
| CN | 101334538 A | 12/2008 |
| JP | 2010271662 A | 12/2010 |
| KR | 20080060106 A | 7/2008 |

OTHER PUBLICATIONS

Li Guochen, the first office action, Dec. 2012, CN.
Li Hui, the International Searching Authority written comments, Jun. 2012, CN.

* cited by examiner

*Primary Examiner* — Ali Alavi
(74) *Attorney, Agent, or Firm* — IPro, Inc.; Na Xu

(57) ABSTRACT

The invention discloses a front frame and a back light module. The front frame comprises at least one stacked plate which is stacked with the front frame. The invention adds the stacked plate on the front frame which the stacked plate is stacked with, so that the structure thickness of the front frame is increased, thereby increasing the total strength. In case that the strength is increased, the plate thickness of the front frame can be reduced, or some structures of the front frame like side walls can be removed, or structure material with low cost can be employed to achieve the aim of reduction of material cost.

26 Claims, 2 Drawing Sheets

FRONT FRAME AND BACK LIGHT MODULE

TECHNICAL FIELD

The invention relates to the field of liquid crystal display (LCD), and more particularly to a front frame and a back light module comprising the front frame.

BACKGROUND

A back light module is one of the key components of an LCD device, with function of providing a light source having sufficient brightness and uniform distribution, so that the LCD device can show images normally.

A front frame has functions of decoration and support in a back light module and an LCD device. As shown in FIG. 1, the structure of a liquid crystal back light module generally includes: a front frame 1, a light guide plate 3, a light source 4, rubber frames 5, a backplane 6, and a PCB panel 7. A liquid crystal panel 2 is arranged on the back light module, and the front frame 1 is arranged on the outmost side of the back light module for packing and integrating components of the back light module in an enclosed mode. China Utility Model Patent No. CN2725935Y, with name of Front Enclosure Component of Liquid Crystal Screen, discloses a front frame structure. As shown in FIG. 2, the front frame 1 is a hollow square plate structure with enclosed side walls 11 around. The front frame 1 can either be made of steel plate and aluminium plate, or be made of plastic or rubber. From the perspective of cost, metal pieces like steel plate, aluminium plate etc. have not been applicable for manufacture of conventional front frames 1. For side walls 11 of the front frame 1, additional processing steps are generally required, thereby increasing the processing cost.

SUMMARY

One aim of the invention is to provide a front frame having high structural strength and low material cost and a back light module comprising the front frame.

The aim of the invention is achieved by the following technical schemes: a front frame also comprises at least one stacked plate arranged on the front frame in a stacked mode.

Preferably, the stacked plate is formed by folding edge structures of the front frame. The edge structures are side walls of the front frame, or plate edges without side wall. The stacked plate can be easily formed by folding. For cost reduction, some front frames are only provided with one or several side walls, and other edges are all plate edges; therefore, the stacked plate can be arranged on side walls and plate edges.

Preferably, the front frame is only provided with one stacked plate. Only one stacked plate is arranged to meet the strength requirement and thus the front frame will not occupy too much space.

Preferably, the front frame is provided with side walls all around, and the stacked plate is arranged on the side walls. The stacked plate is arranged on the side walls to increase the strength of the front frame, thereby reducing the total thickness of the front frame and reducing the manufacture material cost.

Preferably, the front frame comprises at least one plate edge without side walls, and the stacked plate is arranged on at least one plate edge. Generally, to reduce material cost and simplify production process, one or several side walls of the front frame will be removed to form a plate edge, and at least one side wall remains. The side wall itself plays a reinforcement role, and the strength of the plate edge is weakened by removal of the side wall. Thus, the stacked plate is arranged on the plate edge to increase the strength of the plate edge, thereby increasing the total strength of the front frame.

Preferably, the front frame comprises one side wall and three plate edges. Generally, to reduce material cost and simplify production process, three side walls of the front frame is removed to form plate edges, and one side wall remains. Thus, the stacked plate is arranged on the plate edges to increase the strength of the three plate edges, thereby increasing the total strength of the front frame.

Preferably, the stacked plate is arranged on the inner side of the front frame. The front frame is an appearance member; for optimize the structure, it is preferable to arrange the stacked plate on the inner side of the front frame.

Preferably, the front frame is a plastic structure, and the stacked plate is a metal plate. Generally, the front frame can be made of various materials. The front frame made of plastic structure has a lower material cost and thus is widely used. However, the strength of the plastic structure is low. A metal stacked plate with a high strength can be added to increase the strength of the front frame.

Preferably, the metal plate is bonded to the front frame of plastic structure. Bonding is superior to other means like screwing and riveting, because it can avoid drilling on the front frame and avoid other arrangements of the structure, thereby avoiding reduction of the structural strength of the stacked plate.

The aim of the back light module of the invention is achieved by the following technical schemes: a back light module comprises a rubber frame and the front frame mentioned above and fixed on the rubber frame.

Preferably, the front frame is provided with at least one plate edge without side wall and the plate edge is provided with a stacked plate butting with the rubber frame. The position on the rubber frame corresponding to the stacked plate is of a thin-cut design to avoid contact, so that the rubber frame cannot butt with the stacked plate, thereby avoiding the increase of the module thickness due to arrangement of the stacked plate.

The invention adds a stacked plate on the front frame on which the stacked plate is arranged in a stacked mode, so that the thickness of the front frame is increased, thereby increasing the total strength. In case that the strength is increased, the plate thickness of the front frame can be reduced, or some structures of the front frame like side walls can be removed, or structure material with low cost can be selected to achieve the aim of reduction of material cost.

Wherein: 1. Front frame; 2. Liquid crystal panel; 3. Light guide plate; 4. Light source; 5. Rubber frame; 6. Backplane; 7. PCB panel; 11. Side wall; 12. Plate edge; 13. Stacked plate.

DETAILED DESCRIPTION

The invention will further be described in detail in accordance with the figures and the preferred embodiments.

Figure 1:
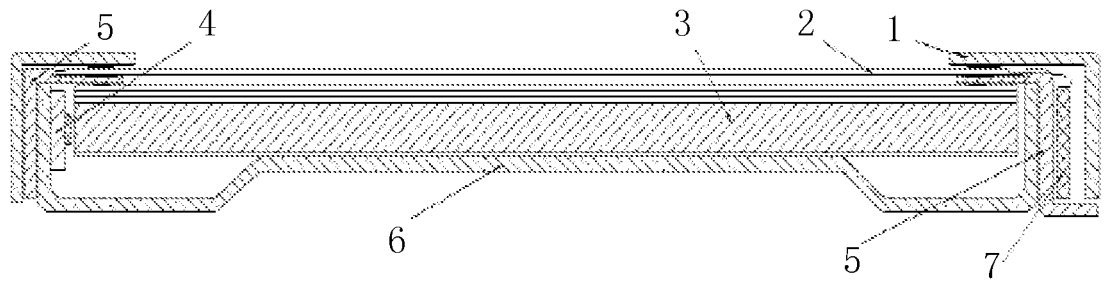
FIG. 1 is a sectional view of a back light module in the art.
Figure 2:
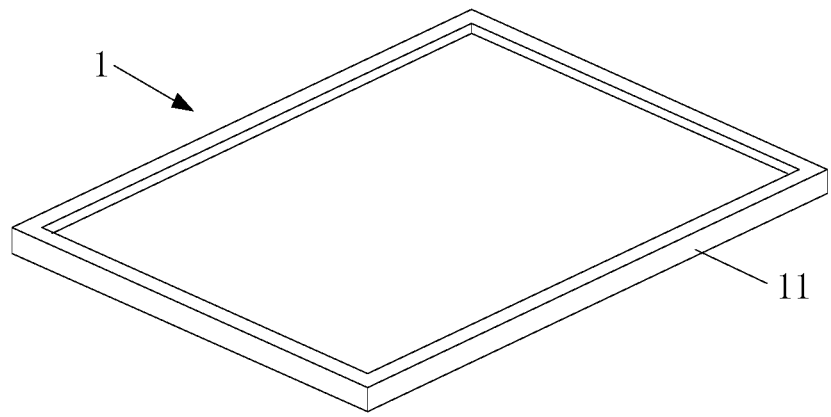
FIG. 2 is a structural diagram of a front frame in the art.
Figure 3:
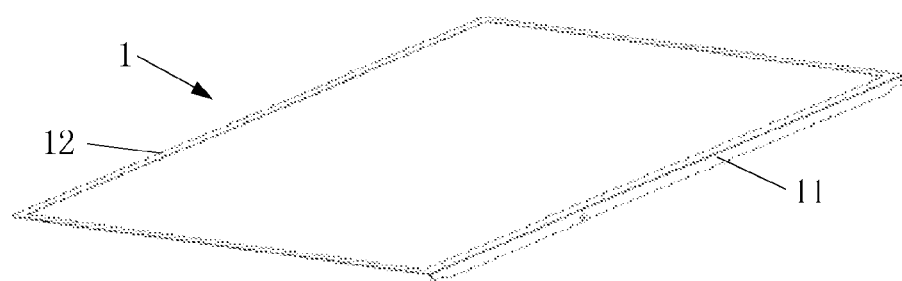
FIG. 3 is a structural diagram of a front frame in accordance with one embodiment of the invention.
Figure 4:
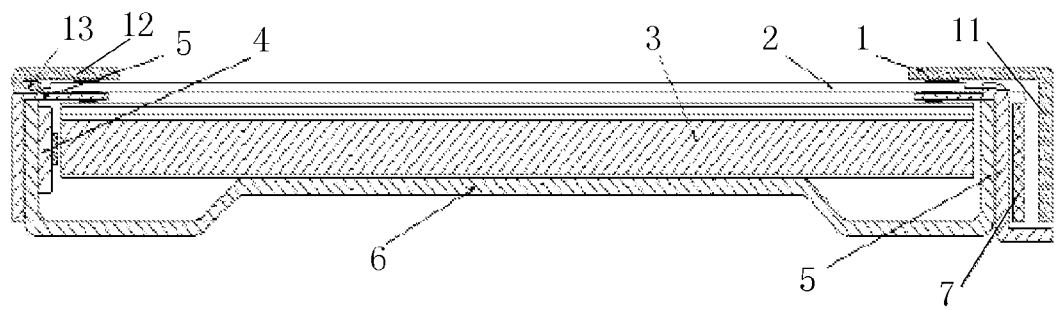
FIG. 4 is a sectional view of a front frame in an LCD module of one embodiment of the invention.

A front frame mainly plays a role as an appearance member as well as a support structure in an LCD device and a back light module. Generally, the front frame is a hollow square structure with side walls around. In design, to reduce the material cost and simplify the processing technology, partial side walls are removed. For example, only one side wall remains and the other three are removed, so that the three edges of the front frame are formed into plate edges. As shown in FIG. 3, to reduce the material cost and simplify the processing technology, the three side walls on the front frame 1 are removed, and only one side wall 11 remains. The other three side walls are formed into plate edges 12. The number of the side walls remained can be decided in accordance with the requirement. In addition, as shown in FIG. 4, a stacked plate 13 is added on the front frame 1. The stacked plate 13 is arranged on the inner side of the plate edge 12 and is formed by folding the plate edge 12; then the thickness of the plate edge 12 is twice the original thickness, thereby increasing the strength of the plate edge 12. The strength of the whole front frame is increased under the support of the plate edge 12 and the stacked plate 13 thereon, thereby avoiding the strength decrease of the front frame 1 due to removal of the three side walls 11. The arrangement of the stacked plate 13 is not limited to the position of the plate edge 12. It is also feasible to be positioned on the side wall 11. The arrangement of the stacked plate 13 can effectively increase the thickness of the edge structures (comprising the plate edge and the side wall) of the front frame 1, thereby increasing the strength of the edge structures. In case that the strength of the front frame 1 is increased, the plate thickness and partial structures of the front frame such as the side wall etc. can be reduced, thereby reducing the material cost of the front frame and simplifying the processing technology.

Figure 5:
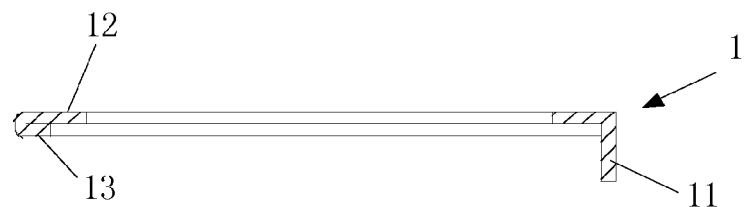
FIG. 5 is a sectional view of a front frame of one embodiment of the invention.

FIG. 4 and FIG. 5 are embodiments of the invention. The stacked plate 13 of the front frame 1 is formed by folding plate edge 12. However, it is not limited to this case. For example, the stacked plate 13 is added and bonded by screws, rivets, and adhesive. For some material having good stickiness, bonding is the most convenient and reliable. There is no need to drill the stacked plate or arrange other structures during bonding. Therefore, the strength of the stacked plate will not be reduced. The stacked plate 13 is folded toward the inner side of the front frame 1, and optionally can be folded outward. The front frame 1 is both an appearance member and a support member, and thus the folding thereof outwards will affect the requirement of industrial design. Some front frames employ a metal structure, and some front frames employs a plastic structure. By comparison, the material cost of the plastic structure is lower. Therefore, stacked plates made of metal structure or high strength material can be added in a stacked mode on the front frame made of plastic structure to increase the total strength of the plastic structure.

In the back light module, the position of the rubber frame 5 where the stacked plate 13 is arranged is required to be of thin-cut design, so that no interaction is caused on the butting position between the stacked plate 13 and the rubber frame 5, thereby avoiding the thickness increase of the back light module due to the arrangement of the stacked plate 13.

In the embodiment of the invention, the strength of the front frame is increased because of the design of the stacked plate, therefore. Thus, the plastic material can be selected as material of the front frame. Optionally, a plastic frame and a metal stacked plate can be combined to obtain a higher structural strength.

In addition, compared with the stacked plates fixed by other means, the stacked plate 13 formed by folding has a better structural strength, because the strength of the circular structure formed in the bend is high. For example, the structural strength of the cylindrical structure is higher than that of the rectangular column. The stacked plate 13 and the plate edge 12 are interconnected, further enhancing the reliability. Therefore, there is no need to drill on the plate edge 12 and the stacked plate 13 to meet the arrangement requirement of screws, rivets etc., and the strength loss because of drilling is avoided.

For conventional front frames, side walls around may not be removed. For such front frames, the stacked plate can be added on side walls to increase the strength of the front frame. In case that the strength of the front frame is ensured, the material can be appropriately removed to reduce the plate thickness of the front frame, or to employ material having a low cost to achieve the aim of reduction of material cost.

The invention is described in detail in accordance with the above contents with the specific preferred embodiments. However, this invention is not limited to the specific embodiments. For the ordinary technical personnel of the technical field of the invention, on the premise of keeping the conception of the invention, the technical personnel can also make simple deductions or replacements, and all of which should be considered to belong to the protection scope of the invention.

The invention claimed is:

1. A front frame comprises at least one stacked plate arranged on the front frame in a stacked mode, wherein the front frame is a plastic structure, and the stacked plate is a metal plate.

2. The front frame of claim 1, wherein the stacked plate is formed by folding edge structures of the front frame and the edge structures are side walls of the front frame or plate edges without side wall.

3. The front frame of claim 1, wherein the front frame is provided with only one stacked plate.

4. The front frame of claim 1, wherein the front frame is provided with side walls all around and the stacked plate is arranged on the side walls.

5. The front frame of claim 4, wherein the front frame comprises at least one plate edge without side wall and at least one plate edge is provided with the stacked plate.

6. The front frame of claim 1, wherein the front frame comprises one side wall and three plate edges, and the three plate edges are provided with the stacked plate.

7. The front frame of claim 1, wherein the stacked plate is arranged on the inner side of the front frame.

8. The front frame of claim 1, wherein the metal plate is bonded to the front frame of plastic structure.

9. A back light module comprises: a rubber frame and a front frame, the front frame being fixed on the rubber frame; the front frame comprises at least one stacked plate arranged on the front frame in a stacked mode.

10. The back light module of claim 9, wherein the stacked plate is formed by folding edge structures of the front frame and the edge structures are side walls of the front frame or plate edges without side wall.

11. The back light module of claim 10, wherein the front frame is provided with at least one plate edge without side wall and the plate edge is provided with the stacked plate which butts the rubber frame.

12. The back light module of claim 9, wherein the front frame is provided only one stacked plate.

13. The back light module of claim 12, wherein the front frame is provided with at least one plate edge without side wall and the plate edge is provided with the stacked plate which butts the rubber frame.

14. The back light module of claim 9, wherein the front frame is provided with side walls all around and the stacked plate is arranged on the side walls.

15. The back light module of claim 14, wherein the front frame comprises at least one plate edge without side wall and at least one plate edge is provided with the stacked plate.

16. The back light module of claim 15, wherein the front frame comprises one side wall and three plate edges, and the three plate edges are provided with the stacked plate.

17. The back light module of claim 16, wherein the front frame is provided with at least one plate edge without side wall and the plate edge is provided with the stacked plate which butts the rubber frame.

18. The back light module of claim 15, wherein the front frame is provided with at least one plate edge without side wall and the plate edge is provided with the stacked plate which butts the rubber frame.

19. The back light module of claim 14, wherein the front frame is provided with at least one plate edge without side wall and the plate edge is provided with the stacked plate which butts the rubber frame.

20. The back light module of claim 9, wherein the stacked plate is arranged on the inner side of the front frame.

21. The back light module of claim 20, wherein the metal plate is bonded to the front frame of plastic structure.

22. The back light module of claim 21, wherein the front frame is provided with at least one plate edge without side wall and the plate edge is provided with the stacked plate which butts the rubber frame.

23. The back light module of claim 20, wherein the front frame is provided with at least one plate edge without side wall and the plate edge is provided with the stacked plate which butts the rubber frame.

24. The back light module of claim 9, wherein the front frame is a plastic structure, and the stacked plate is a metal plate.

25. The back light module of claim 24, wherein the front frame is provided with at least one plate edge without side wall and the plate edge is provided with the stacked plate which butts the rubber frame.

26. The back light module of claim 9, wherein the front frame is provided with at least one plate edge without side wall and the plate edge is provided with the stacked plate which butts the rubber frame.

* * * * *